Feb. 17, 1931.  G. N. VAN DERHOEF  1,792,618
BEARING
Filed May 23, 1927
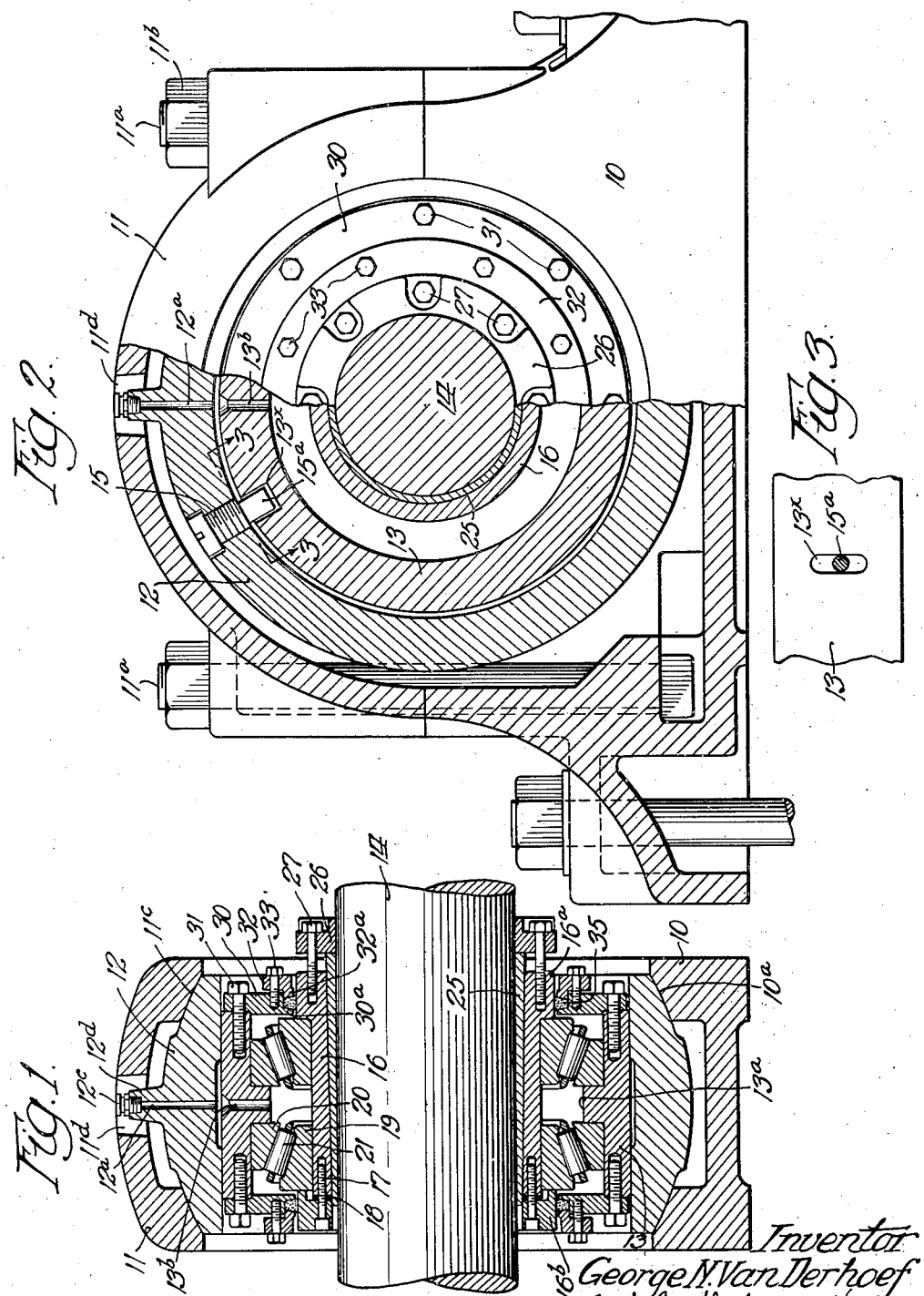

Patented Feb. 17, 1931

1,792,618

UNITED STATES PATENT OFFICE

GEORGE N. VAN DERHOEF, OF MISHAWAKA, INDIANA, ASSIGNOR TO DODGE MANUFACTURING CORPORATION, OF MISHAWAKA, INDIANA, A CORPORATION OF DELAWARE

BEARING

Application filed May 23, 1927. Serial No. 193,415.

This invention relates to improvements in bearings, and has among its objects to provide a bearing construction which may be assembled at the factory or place of manufacture, charged with lubricant, and shipped as a unit to the customer, who needs only mount the same with respect to the shaft or other element which it is to journal, after which it is only necessary to clamp the shaft-engaging elements to the shaft, a simple operation which is performed without disturbance of the bearing elements. Another object is to provide a bearing structure which may be assembled at the factory, charged with lubricant and shipped without danger of access of dirt, dust, or other detrimental substances to the interior of the bearing housing. Another object is to provide a bearing in which the bearing elements may be adjusted from the exterior thereof, as necessary, to provide or take up clearance without disassembly or removal of the bearing or portions thereof from the shaft. Another object is to provide a structure wherein the grease sealing member will be maintained in constant concentricity with respect to the rotating elements of the bearing despite disalignment or rocking of the shaft.

Other objects reside in the details and arrangement of the parts as will be more fully set forth and described in the following specification and shown in the accompanying drawing in which—

Fig. 1 is a vertical longitudinal section through an embodiment of my invention, a shaft being illustrated in elevation.

Fig. 2 is a partial vertical transverse section of the same.

Fig. 3 is a section along the line 3—3 of Fig. 2.

In the drawings I have shown my invention as applied to a bearing capable of accommodating both the expansion or contraction of the shaft and a tilting or rocking movement, but it should be clearly understood that my invention is likewise applicable to other types of bearing.

In the drawings 10 indicates a base having the cap 11 formed separately therefrom and secured in assembled relation by means of the bolts $11^a$ and nuts $11^b$, as illustrated in Fig. 2. The base and cap 11 are concaved in the form illustrated as indicated by numerals $10^a$ and $11^c$, to accommodate the outer housing 12, as I term it, which is convexly formed for a rocking adjustment or alignment of the surfaces $10^a$ and $11^c$. Located within the outer housing 12 in an inner housing 13, slidable with respect thereto to accommodate longitudinal movement of the shaft 14 under changing temperature conditions or the like.

The inner housing 13 is provided with the inwardly projecting shoulder or rib $13^a$ through which extends a lubricant charging aperture $13^b$ (see Figs. 1 and 2) in alignment with a similar aperture $12^a$ in the outer housing. The cap 11 is provided with a hole or opening $11^d$ through which extends a lug $12^d$ formed on the inner housing 12, the same being provided with the threaded closure plug $12^e$, removable to permit charging of grease or other lubricant into the interior of housing 13.

Concentric with and spaced from the inner housing 13 is the sleeve 16 having a peripheral outwardly projecting shoulder $16^a$ at one end and a detachable shoulder portion $16^b$ at the other end. This detachable shoulder $16^b$ is removably secured to the sleeve 16 by means of the threaded cap screws 17. I have illustrated shims 18 interposed between this removable shoulder portion $16^b$ and the body of the sleeve 16 to permit variations in the spacing between these elements for adjustment purposes, as will be described hereinafter. To prevent relative rotative movement between the inner housing and the outer housing 12, I provide a cap screw 15 carried by the outer housing 12 provided with a smooth projecting tip $15^a$ mounted in longitudinal slot $13^x$ on the inner housing 13 (see Figs. 2 and 3). This slot $13^x$ will permit relative axial or longitudinal movement of the inner and outer housings, but will prevent relative rotative movement therebetween.

Mounted upon the sleeve 16 in close frictional contact therewith are the bearing cones 19 and thereabove frictionally engaging the inner surfaces of the housing 13 are the coacting bearing cups 20, roller or other bearings 21 being interposed between cones and cups in well known manner. The shoulder or rib 13ª acts as a stop and positioning member for the cups 20 which are thus maintained in proper spaced relation as to each other, and are properly positioned with respect to the cones 19. One cone 19 is positioned by the shoulder 16ª of the sleeve 16, and the other cone 19 is positioned by the removable shoulder portion 16ᵇ, as illustrated in Fig. 1.

In making adjustment of the bearing unit, comprising elements 19, 20 and 21, the shoulder portion 16ᵇ may be adjusted by removal or addition of shims 18 as will be readily understood, and having properly adjusted the bearing elements, the adjustment will remain undisturbed during mounting or removal of the entire structure.

Concentric with and located inside the sleeve 16 is a coacting tube 25, preferably split, and of such size as to be slidable upon shaft 14. The outer surface of the tube 25 is tapered or inclined, as is the coacting inner surface of the sleeve 16. This provides a wedging action between the tube and sleeve when relative movement is had. To obtain such movement a collar 26 is provided, slidable over the shaft 14 into contact with the projecting end of the tube 25, as illustrated in Fig. 1. Threaded bolts or cap screws 27 extend through the collar 26 into threaded engagement with the shoulder 16ª of the sleeve 16. By this means the sleeve and tube may be relatively displaced or moved longitudinally of the shaft 14 to increase the wedging action exerted upon the split tube 25 and thereby increase its grip or frictional engagement of the shaft 14. This permits the combination of the bearing structure with shafts which may be somewhat over or under-sized, a decided advantage, as will be recognized by those skilled in the art.

Secured to each side of the inner housing 13 is a ring 30, secured by cap screws or bolts 31. This ring 30 is notched or recessed at its inner edge as indicated by numeral 30ª, and a second coacting ring 32 is secured by bolts 33 or the like thereto with an inwardly projecting rib or flange 32ª, between which and the ring 30 is clamped a grease ring 35 of felt or the like. The inner peripheries of the rings 30, 32, are constructed to lie adjacent and slightly spaced from the shoulders 16ª and 16ᵇ, the felt or other ring 35 being compressed by the rings to bear against the outer periphery of the shoulders, thus sealing the interior of housing 13 to prevent exudation or leakage of the grease or other lubricant, as well as to prevent entry of dust, dirt, water or the like. One decided advantage of my construction is that even though the shaft 14 be tilted or rocked slightly out of its proper alignment, the spacing between the rings 30, 32, and the rotating shoulders 16ª and 16ᵇ will be maintained constant, and consequently there will be no distortion or eccentricity imparted to the sealing ring 35, since housings 12 and 13 and rings 30 and 32 must rock with the sleeve 16, due to the construction shown and described.

The bearing structure described above, as stated, permits longitudinal as well as rocking adjustment, but it will be obvious that in a socket or spherical construction which permits rocking alignment only, the inner and outer housings 13 and 12 might be merged as one element, and my invention is applicable to either construction, as well as to other variations or modifications.

It will be understood from the above construction that the bearing structure may be completely assembled, adjusted and charged with lubricant at the factory and shipped to the user. The interior of the housings during shipment is protected even with the use of the split tube 25 by virtue of the presence of the sleeve 16, and it is only necessary for the user to displace tube 25 sufficiently relative to the sleeve 16 to permit sliding of the bearing over the shaft 14 to the desired location, after which the ring 26 may be moved without disturbance of the bearing assembly to exert proper clamping or grip of the tube 25 upon the sleeve 16 to ensure rotation of the sleeve with the shaft 14. The elements of the bearings proper are adjusted at the factory, and such adjustment remains undisturbed during the assembly of the bearing to the shaft.

Should it be desired to take up play in the bearings themselves, this may be done at the installation without disassembly of the bearing structure or components, except possibly to remove the shoulder portion 16ᵇ and remove or add shims, a simple operation, which can be readily performed without disturbance or disassembly of the bearing structure.

As described above, the grease ring or seal is maintained in concentricity to the sleeve 16, regardless of disassembly or disalignment of the shaft 14, which ensures proper maintenance of lubrication and prevention of leakage.

It will be obvious that my invention is susceptible of modification and variation from the form illustrated and described, and I do not wish to be restricted to such form, except as defined in the appended claims.

What I claim is:

1. In combination, an outer housing, an inner housing means slidable axially with respect thereto and including a sleeve, bearing units mounted on said sleeve and encased in said housing means, a tube located within said sleeve, said tube and sleeve being provided with contacting wedging surfaces, said sleeve having a plain cylindrical exterior surface on which the inner race rings of said bearing units are fitted, means coacting between said sleeve and tube to relatively displace the one with respect to the other, and means associated with said sleeve to adjust said bearing units in said housing means.

2. In combination, housing means including a sleeve, bearing units encased in said housing means, said bearing units comprising spaced cups and cones with tapered rollers interposed therebetween, a tube located within said sleeve, said tube and sleeve being provided with coacting wedging surfaces, and means coacting with said tube and sleeve to relatively displace the one with respect to the other, said sleeve having a plain cylindrical exterior surface on which said cones are fitted and being provided with an adjustable shoulder operable to adjust said cones in said housing means.

3. In combination, a housing member having a central internal rib, bearing cups fixed in said housing on opposite sides of and abutting against said rib, a sleeve in said housing member and concentric therewith, bearing cones slidably mounted on said sleeve in spaced relation, tapered roller bearing elements interposed between said cups and cones, and means associated with said sleeve to effect adjustment of the relative positioning of said cones and thereby to adjust or eliminate the play of said bearing elements.

4. In combination, a housing member having a central internal rib, bearing cups fixed in said housing on opposite sides of and abutting against said rib, a sleeve in said housing member and concentric therewith, bearing cones slidably mounted on said sleeve in spaced relation, tapered roller bearing elements interposed between said cups and cones, and means associated with said sleeve to effect adjustment of the relative positioning of said cones and thereby to adjust or eliminate the play of said bearing elements, said last named means including a shoulder formed integrally on said sleeve and an adjustable shoulder also on said sleeve, said shoulders maintaining said cones against outward movement.

5. In combination, a housing member having spacing means intermediate its ends, bearing cups fixed in said housing and spaced by said means, a sleeve in said housing member and concentric therewith, bearing cones slidably mounted on said sleeve in spaced relation, tapered roller bearing elements interposed between said cups and cones, means associated with said sleeve to effect adjustment of the relative positioning of said cones and thereby to adjust or eliminate the play of said bearing elements, a contractile tube extending through said sleeve, said tube and sleeve being provided with complementary tapered contacting surfaces, and means co-acting with said tube and sleeve to relatively displace the same to contract said tube or permit expansion thereof.

6. A shaft bearing comprising, in combination, a sleeve having a tapered bore and exteriorly enlarged at the end at which the bore is of greatest diameter, an exteriorly tapered contractile tube extending through and fitted in the sleeve, a pair of symmetrically arranged bearing units mounted on said sleeve, each comprising cup and cone bearing rings and interposed bearing rollers, a housing embodying a member in which the outer bearing rings are fitted, said member having means arranged between and cooperating with the outer bearing rings for positioning them, the enlarged end of said sleeve providing an abutment shoulder for one of the inner bearing rings, means co-acting with said enlarged end of the sleeve and with said tube to force the tube into the sleeve, and means adjustably secured to the opposite end of said sleeve providing an adjustable abutment for the adjacent inner bearing ring, said inner bearing rings being positioned between said adjustable abutment and the shoulder on the enlarged end of the sleeve.

7. A shaft bearing comprising, in combination, a sleeve having a tapered bore and exteriorly enlarged at the end at which the bore is of greatest diameter, an exteriorly tapered contractile tube extending through and fitted in the sleeve, a pair of symmetrically arranged bearing units mounted on said sleeve, each comprising cup and cone bearing rings and interposed bearing rollers, a housing embodying a member in which the outer bearing rings are fitted, said member having means arranged between and cooperating with the outer bearing rings for positioning them, the enlarged end of said sleeve providing an abutment shoulder for one of the inner bearing rings, means co-acting with said enlarged end of the sleeve and with said tube to force the tube into the sleeve, means adjustably secured to the opposite end of said sleeve providing an adjustable abutment for the adjacent inner bearing ring, said inner bearing rings being positioned between said adjustable abutment and the shoulder on the enlarged end of the sleeve, removable end plates carried by the said housing member, and seals between said end plates and the enlarged end of said sleeve and adjustable abutment at its other end.

8. A shaft bearing comprising, in combination, a sleeve having a tapered bore and exteriorly enlarged at the end at which the bore is of greatest diameter, an exteriorly tapered contractile tube extending through and fitted in the sleeve, a pair of symmetrically arranged bearing units mounted on said sleeve, each comprising cup and cone bearing rings and interposed bearing rollers, an inner housing member in which the outer bearing rings are fitted, a concentric outer housing member, a third supporting member, said three members movably interfitted in one another, two of them having spherical contact surfaces to permit relative angular play about the center of the bearing, and two of them slidably fitted to permit relative axial play, said inner housing members having means arranged between and cooperating with the outer bearing rings for positioning them, the enlarged end of said sleeve providing an abutment shoulder for one of the inner bearing rings, means co-acting with said enlarged end of the sleeve and with said tube to force the tube into the sleeve, and means adjustably secured to the opposite end of said sleeve providing an adjustable abutment for the adjacent inner bearing ring, said inner bearing rings being positioned between said adjustable abutment and the shoulder on the enlarged end of the sleeve.

In testimony whereof, I have signed my name to this specification.

GEORGE N. VAN DERHOEF.